United States Patent [19]

Crooks

[11] Patent Number: 4,476,744
[45] Date of Patent: Oct. 16, 1984

[54] MULTI-SPEED FAN DRIVE APPARATUS
[76] Inventor: James W. Crooks, 341 N. Range Line Rd., Carmel, Ind. 46032
[21] Appl. No.: 252,959
[22] Filed: Apr. 10, 1981
[51] Int. Cl.³ .............................................. F16H 3/74
[52] U.S. Cl. .................................... 74/751; 192/58 B; 192/82 T; 192/12 B
[58] Field of Search ............. 74/751, 761, 766, 752 R, 74/752 B, 752 C, 752 D; 192/82 T, 12 A, 12 B, 58 B; 123/41.12

[56] References Cited
U.S. PATENT DOCUMENTS

| | | | |
|---|---|---|---|
| 2,266,740 | 12/1941 | Cotterman | 192/0.01 |
| 2,945,570 | 7/1960 | Ferguson et al. | 192/3.6 |
| 3,359,831 | 12/1967 | Scheiter | 123/41.12 |
| 3,532,008 | 10/1970 | Fanstone | 74/789 |
| 3,721,135 | 3/1973 | Kelley | 74/766 X |
| 3,804,219 | 4/1974 | Cummings | 192/82 T |
| 3,972,399 | 8/1976 | Bopp | 192/58 B |
| 4,036,339 | 7/1977 | Kikuchi | 192/58 R |
| 4,046,239 | 9/1977 | Pinholt | 192/58 B |
| 4,064,980 | 12/1977 | Tinholt | 192/52 B |
| 4,265,135 | 5/1981 | Smirl | 192/82 T X |

Primary Examiner—Leslie A. Braun
Assistant Examiner—Frank H. McKenzie, Jr.

[57] ABSTRACT

A multi-speed fan drive apparatus is disclosed which includes a pair of concentric shafts rotatable relative a fixed support and carrying clutch plates engageable to stop rotation of the shafts relative the fixed support. A pair of different-sized sun gears are carried on the two shafts and are intermeshed with planet gears rotatably mounted upon a planet gear carrier. Drive means is provided for driving the planet gear carrier in a given direction and a ring gear, with a fan blade connected thereto, is intermeshed with the planet gears. Means are provided for stopping rotation of one or the other of the sun gears with respect to the fixed support, and also for causing the shafts and sun gears to rotate in unison with the planet gear carrier and therefore the ring gear, to obtain three speeds of operation. Alternate embodiments are also disclosed which include different means for limiting rotation of the sun and ring gears, and in one embodiment there is included a single sun gear and planet gear arrangement providing a two-speed apparatus.

27 Claims, 13 Drawing Figures

MULTI-SPEED FAN DRIVE APPARATUS

BACKGROUND OF THE INVENTION

1. Field of the Invention

The present invention relates to the field of fan drive devices, and particularly to a multi-speed fan drive.

2. Description of the Prior Art

Devices for fan drives are well known in the prior art, and typically have included a one-speed direct drive coupling or a variable-speed fluid shear coupling mechanism. The purpose of the viscous fluid couplings of the prior art typically has been to provide for variable speed driving of the fan depending upon a monitored speed or temperature.

In U.S. Pat. No. 4,064,980, issued to Tinholt on Dec. 27, 1977, there is disclosed a dual speed viscous fluid coupling. The Tinholt device includes an output member defining two fluid chambers and an input member disposed in each of the fluid chambers. The input members are driven at two different rotational speeds. The dual speeds for the coupling are provided by selectively pumping a viscous fluid into one or the other of the fluid chambers to derive the speed associated with the input member within the respective chamber. Another multi-speed fan drive is disclosed in U.S. Pat. No. 3,972,399, issued to Bopp on Aug. 3, 1976. The Bopp device includes a viscous fluid working chamber and a temperature control which operates to vary the volume of fluid within the chamber to derive differing speeds in response to temperature changes. Another version of a temperature sensitive coupling for fan drives is shown in U.S. Pat. No. 4,036,339 issued to Kikuchi on July 19, 1977. The Kikuchi device uses a magnetic force to overcome a spring force below a selected temperature to provide a first drive speed. At higher temperatures, the magnetic attraction is lower than the spring force and fluid is transferred into the working chamber to provide a second speed for the fan.

It is desirable that a multi-speed fan drive provide fan speeds which are within desired ranges. It is also preferable that the fan drive have a minimum amount of frictional or other losses associated with the driving action. The prior art multi-speed devices have generally been associated with fluid shear drives which by the nature of the fluid shear action have frictional losses and inefficiencies associated with them. In contrast to the prior art, it is a particular advantage of the present invention that a multi-speed fan drive is provided which includes a direct drive of the fan at the differing speeds to minimize these losses and inefficiencies, and also to positively control the desired minimum to maximum fan speed range.

The use of planetary gear assemblies is well known in transmission systems. In U.S. Pat. No. 3,532,008, issued to Fanstone on Oct. 6, 1970, there is disclosed a planetary transmission with slip couplings. The Fanstone device directly relates to outboard motor transmission systems, and discloses in FIGS. 12 and 13 a typical planetary gear arrangement. In certain instances, the planetary gear transmissions have included over-running or one-way clutches. Examples of such transmission systems are shown in U.S. Pat. No. 2,945,570, issued to Ferguson et al. on July 19, 1960 and U.S. Pat. No. 2,266,740, issued to Cotterman on Dec. 23, 1941. A further example of an over-running clutch is shown in U.S. Pat. No. 4,046,239, issued to Tinholt on Sept. 6, 1977.

SUMMARY OF THE INVENTION

Briefly described in one aspect of the present invention, there is provided a multi-speed fan drive apparatus comprising a pair of different sized sun gears, a planet gear carrier including planet gears intermeshed with each of the sun gears, and a ring gear assembly including a ring gear intermeshed with each of the planet gears. A drive means is connected with and rotates the planet gear carrier, and a fan blade is mounted in driving connection with the ring gear assembly. Means are provided for preventing the sun gears from rotating in given directions, and also for causing the planet gear carrier and ring gear assembly to rotate in unison. In a related aspect, the present invention includes a multi-speed fan drive apparatus including a single sun gear, planet gear carrier and ring gear.

It is an object of the present invention to provide a multi-speed fan drive which can precisely produce two, three or more separate speeds for a fan drive.

Another object of the present invention is to provide a multi-speed fan drive which is responsive to selected, monitored temperatures.

A further object of the present invention is to provide a multi-speed fan drive which is capable of producing separate, distinct fan speeds by means of a direct coupling with a fan, thereby reducing losses and inefficiencies.

It is another object of the present invention to provide a multi-speed fan drive which is readily adaptable for use with different equipment and also to provide different, selected speeds for the fan.

It is a further object of the present invention to provide a fan drive apparatus including components which carry a minimum of the torque loads associated with the fan blade.

Another object of the present invention is to provide a fan drive apparatus which avoids certain disadvantages associated with fluid shear drives, such as problems of fluid variations, fluid evacuation problems and input speed limitations.

Further objects and advantages of the present invention will become apparent from the description of the preferred embodiments which follows.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
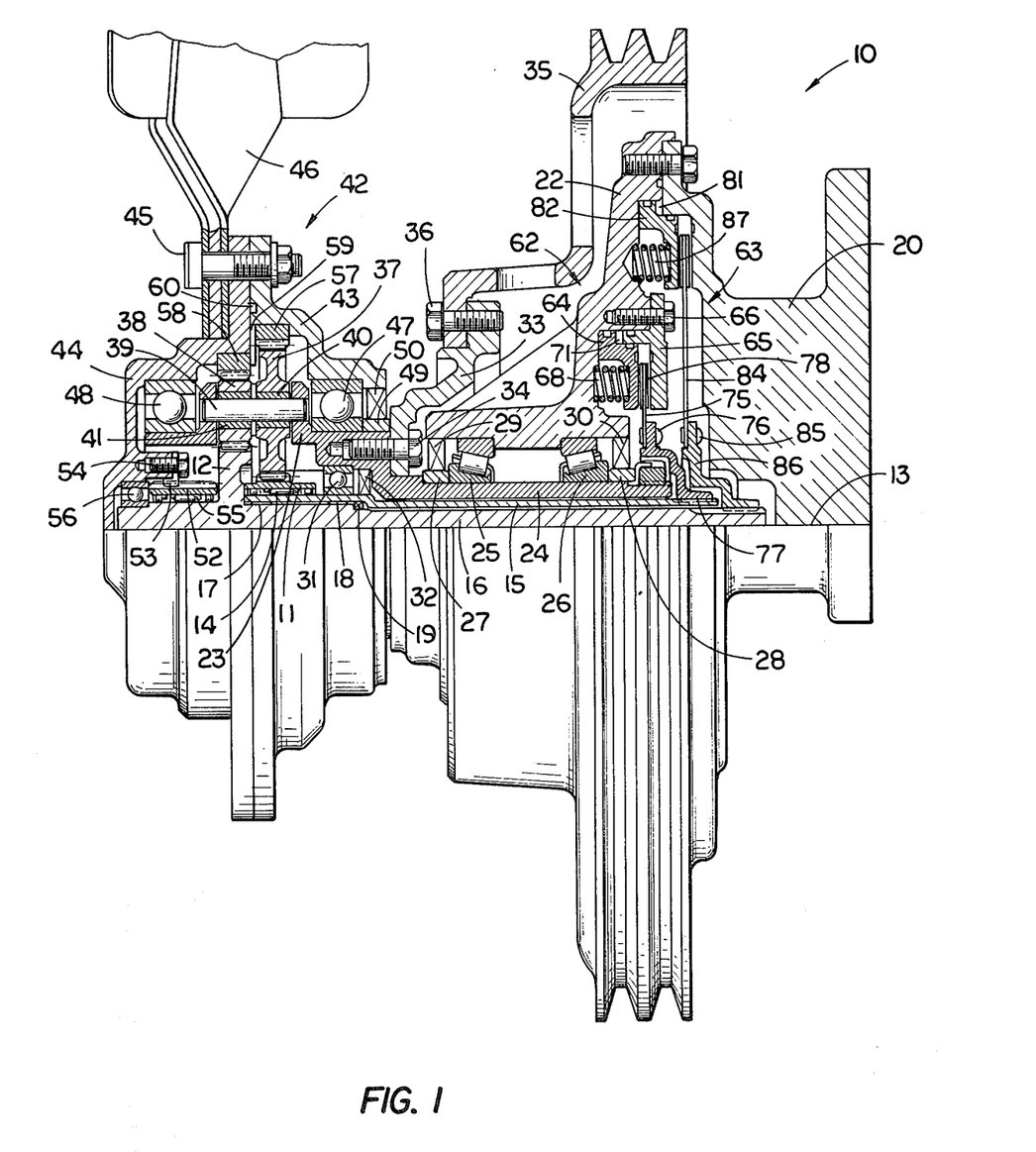
FIG. 1 is a side, elevational view, partially in cross section, of a preferred embodiment of a multi-speed fan drive apparatus constructed in accordance with the present invention.

Referring in particular to FIG. 1, there is shown a first preferred embodiment of a multi-speed fan drive apparatus constructed in accordance with the present invention. The apparatus 10 includes a first sun gear 11 and a second sun gear 12 independently rotatable about a common, central axis 13. An over-running or one-way brake 14 is mounted between and connects the sun gear 11 and a first shaft 15. The second sun gear 12 is connected with, or preferably integral with, a second shaft 16 which is rotatable coaxial with and received within the first shaft 15. The second sun gear 12 has more gear teeth than the first sun gear 11. Bearing members 17 and 18 and a rotary seal 19 are disposed between the first and second shafts to provide for relative rotation therebetween while preventing fluid loss.

Figures 2, 5, 6:
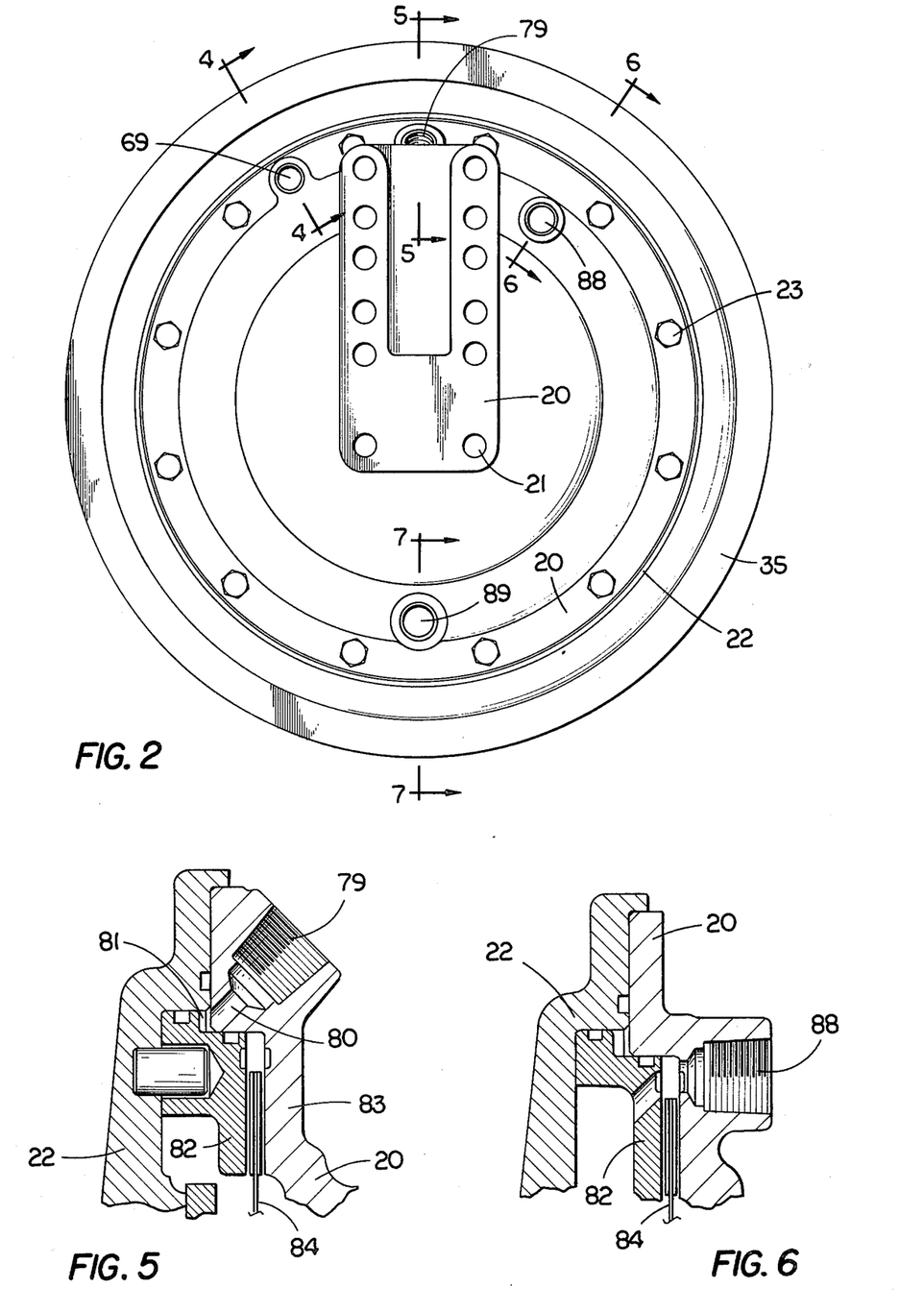
FIG. 2 is an end, elevational view of the apparatus of FIG. 1.
FIG. 5 is a side, partial cross-sectional view of the apparatus of FIG. 1, taken along the line 5—5 in FIG. 2 and looking in the direction of the arrows.
FIG. 6 is a partial, side cross-sectional view of the apparatus of FIG. 1, taken along the line 6—6 in FIG. 2 and looking in the direction of the arrows.

The apparatus 10 is mountable to a fixed support by means of a mounting member 20, which may be mounted, for example, to a vehicle engine with bolts (not shown) received through apertures 21 (FIG. 2). A support member 22 is secured to the mounting member 20 with bolts (FIG. 1) received through aligned apertures in the two members.

Planet gear carrier 23 includes a hollow shaft portion 24 received between the shafts 15 and 16 and the support member 22, and within which the first and second shafts are received. Tapered roller bearings 25 and 26 are mounted between the shaft portion 24 of the planet gear carrier and the support member 22, to provide for relative rotation therebetween. The tapered roller bearings are held in position by thrust washers 27 and 28, and seals 29 and 30 are provided to prevent fluid loss. A ball bearing 31 is mounted between the first shaft 15 and the planet gear carrier 23 to facilitate relative rotation therebetween, and a seal 32 is provided for the ball bearing.

A drive means is provided for rotating the planet gear carrier about the central axis 13. Such drive means may preferably include, for example, a pulley mount 33 which is secured with bolts 34 to the planet gear carrier. A pulley 35 is in turn secured to the pulley mount 33 with bolts 36. The pulley 35 may be connected with belts to an appropriate drive source, such as a vehicle engine crankshaft. By the described construction, the configuration and location of the pulley may be readily varied to accommodate different requirements, simply by employing a differently shaped pulley which is mounted to the pulley mount 13 in the described fashion. It will be appreciated as well that other drive sources and means for coupling the drive sources to the planet gear carrier could readily be employed by appropriate modification of the preferred embodiment.

Figure 3:
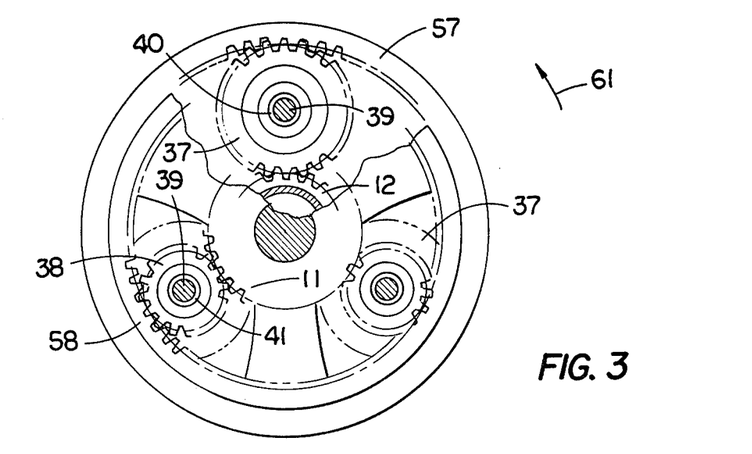
FIG. 3 is a schematic view of the planetary gear assemblies used in the apparatus of FIG. 1.
Figure 8:
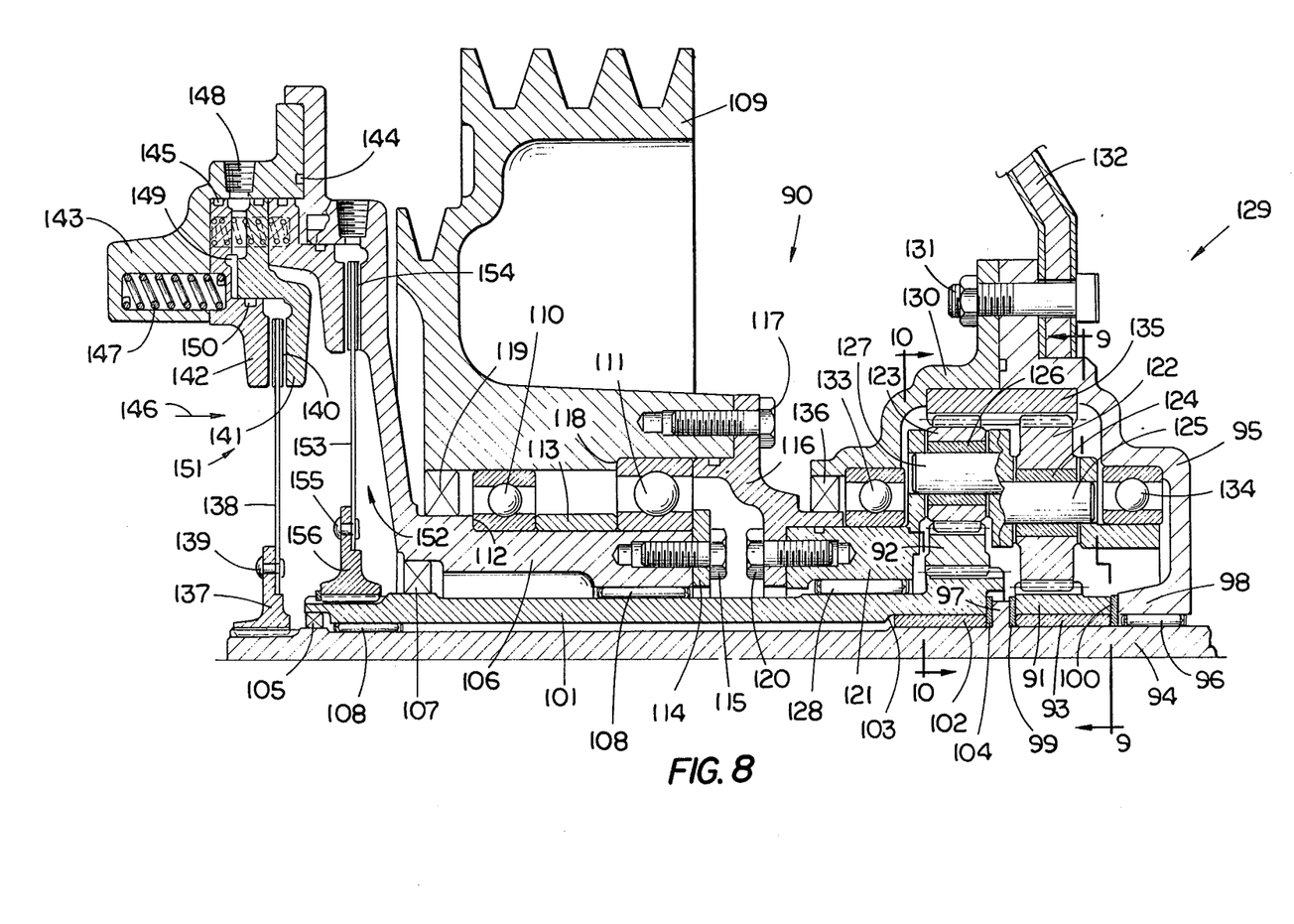
FIG. 8 is a partial, side cross-sectional view of the upper half of an alternate embodiment of a multi-speed fan drive apparatus constructed in accordance with the present invention.
Figure 9:
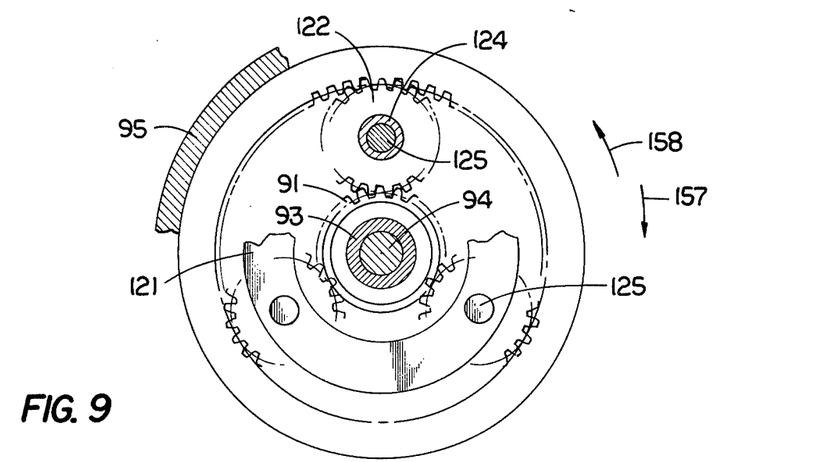
FIG. 9 is an end, somewhat schematic cross-sectional view of an apparatus as shown in FIG. 8, taken along line 9—9 and looking in the direction of the arrows.
Figure 10:
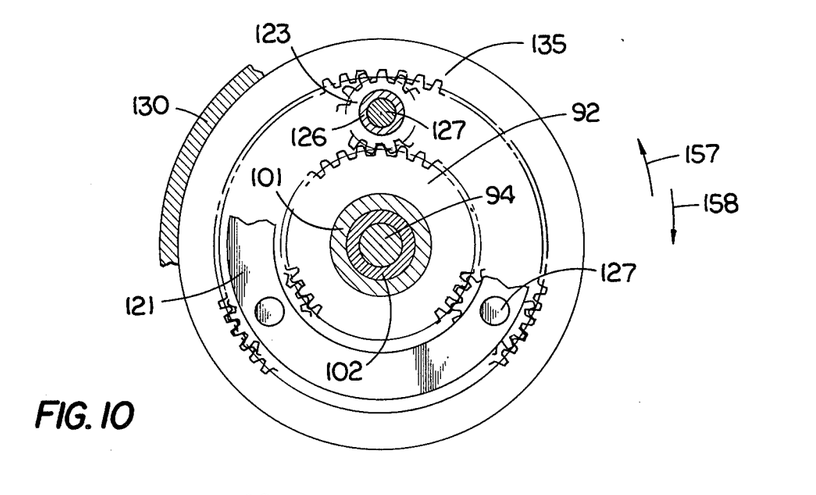
FIG. 10 is an end, somewhat schematic cross-sectional view of an apparatus as shown in FIG. 8, taken along line 10—10 and looking in the direction of the arrows.

The planet gear carrier 23 includes at least a first rotatable planet gear 37 intermeshed with the first sun gear 11, and at least a second rotatable planet gear 38 intermeshed with the second sun gear 12. As further described below, the relative sizes and placements of the planet gears and sun gears may be varied to a considerable degree depending upon the coupling characteristics which are desired for the apparatus. In a particular aspect, the planet gears may be located at different radial locations from the central axis, as shown in the embodiment of FIGS. 8-10. However, it is preferred that the planet gears be mounted coaxial, as shown particularly in FIGS. 1 and 3, to provide a more simplified construction for the planet gear assembly. A shaft 39 is press fit within aligned apertures in the planet gear carrier 23, and the planet gears such as 37 and 38 are rotatably mounted on the shaft 39 with bushings 40 and 41, respectively. Preferably, there are included a plurality of each of the first and second planet gears 37 and 38, and most suitably at least three of such gears mounted in a balanced relationship about the central axis.

A ring gear assembly, designated generally at 42, is mounted to be rotatable about the central axis 13. The ring gear assembly 42 includes housing members 43 and 44 secured together with bolts 45 received through aligned apertures in the two members. In a particular application of the present invention, a fan spider 46 carrying a plurality of fan blades is also secured to the housing members with the bolts 45. Ball bearings 47 and 48 are mounted between the housing members 43 and 44, respectively, and the planet gear carrier 23 to provide for relative rotation therebetween. A thrust washer 49 and associated seals such as 50 are also mounted between the housing member 43 and the planet gear carrier 23. A collar 52 is secured by means of a spline to a ring member 53 which is secured to the housing member 44 by bolts, such as 54. An over-running or one-way brake 55 is press fit between the collar 52 and the second shaft 16 to permit relative rotation therebetween in only one direction, as will be described further below. A ball bearing 56 is also mounted between the housing member 44 in the shaft 16 to permit relative rotation therebetween.

The ring gear assembly 42 further includes a pair of ring gears 57 and 58 which are positioned to be rotatable about the central axis 13 and which intermesh with the planet gears 37 and 38, respectively. As shown, the ring gears 57 and 58 are mounted to the housing members 43 and 44, respectively, and are held in place by a thrust washer 59. A seal 60 is also positioned between the housing members 43 and 44 to prevent fluid loss therefrom.

In accordance with the present invention, there are provided rotation-limiting means for limiting the rotation of various components of the apparatus to provide several degrees of coupling between the driving planet gear carrier 23 and the driven ring gear assembly 42. In general, these rotation-limiting means are the following. A first such means is provided for preventing the first sun gear 11 from rotating about the central axis in a first direction relative the fixed support. A similar such means is provided for preventing the second sun gear 12 from rotating about the central axis in a second direction, opposite the first direction, relative the fixed support. Finally, a third such means is providing to cause the planet gear carrier 23 and the ring gear assembly 42 to rotate about the central axis in unison.

As will be further discussed below, the relative directions of rotation for the various components and the planet gear carrier will depend upon the structuring of the planetary gear assembly. In the preferred embodiment as shown in FIG. 1, there are used only single planet gears to connect between the associated sun gears and ring gears. As is known in the art, however, planetary gear assemblies may include dual planet gears which would therefore reverse the directional relationships of the sun gear and ring gear. The present invention contemplates such alternate embodiments, and such variations are not considered to depart from the scope of the present invention. However in the preferred embodiment, the single planet gear relationship is desired. In such embodiment and for the purposes of description herein, the planet gear carrier 23 is considered to rotate in a first direction 61 (FIG. 3), and the rotation-limiting means correspondingly limit rotation in the directions previously recited.

The rotation-limiting means may suitably comprise a pair of clutch mechanisms, designated generally at 62 and 63, which operate in a similar fashion to stop the relative rotation of the first and second shafts, respectively, with respect to the fixed support. The operation of these clutch mechanisms is typical, and therefore will only be briefly described herein. Clutch mechanism 62 (FIG. 4) includes a pair of clutch members 64 and 65, the latter being secured to the support member 22 with bolts such as 66 (FIG. 1). Clutch member 64 is slidable axially with respect to the clutch member 65 along pins 67 received in corresponding apertures. In conventional fashion, a spring 68 is positioned between the support member 22 and clutch member 64 and urges the clutch member 64 in the direction of the corresponding clutch member 65. A suitable source of pressurized fluid is connected at the port 69 which connects through passageways 70 to a chamber 71 positioned between the respective clutch members and surrounded with seals 72-74 to retain the pressurized fluid therein. A clutch plate 75 is secured with rivets 76 to a clutch plate support 77 attached with first shaft 15 by means of a spline or other suitable means. A friction material 78 is secured on either side of the clutch plate 75 in the region between the clutch members 64 and 65.

Figure 4:
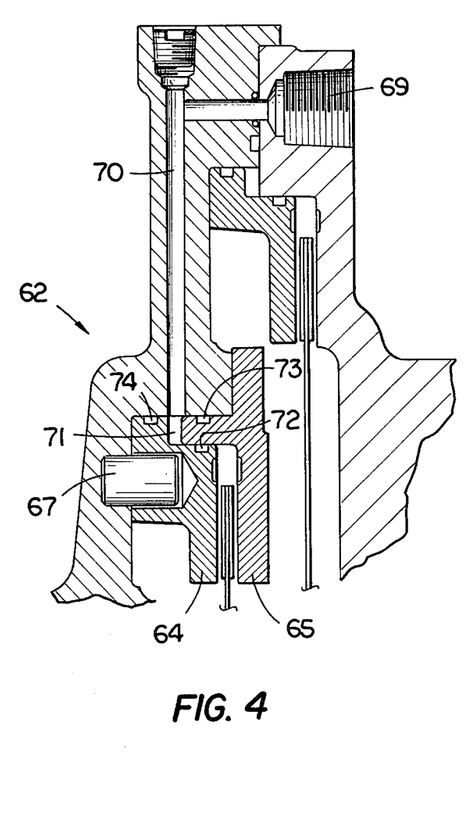
FIG. 4 is a partial, side cross-sectional view of the apparatus of FIG. 1, taken along the line 4—4 in FIG. 2 and looking in the direction of the arrows.

In operation, the clutch mechanism 62 has two conditions, the first in which the shaft 15 is permitted to rotate freely with respect to the fixed support, and the second in which the shaft 15 is prevented from rotating relative the fixed support. In the first condition, a suitable control valve means connects a pressurized fluid source with the chamber 71. The pressure of the fluid acts against the spring 68 to prevent the clutch members 64 and 65 from closing against the clutch plate 75. In the second condition, the control valve means operates to close the connection of the pressurized fluid source with the chamber 71. The consequent loss of pressure in the chamber results in the spring 68 successfully urging the clutch members 64 and 65 together to engage the clutch member 78 and prevent its rotation with respect to the fixed support.

The clutch mechanism 63 operates in a similar fashion to selectively permit or prevent the rotation of the second shaft 16 with respect to the fixed support. Briefly, the clutch mechanism 63 includes a connecting port 79 and passageway 80 leading to a chamber 81 (FIG. 5) between the clutch member 82 and clutch portion 83 of the mounting member 20. As in the case of the first clutch mechanism, the second clutch mechanism 63 operates in two conditions. In the first condition, the fluid pressure in the chamber 81 is sufficient to prevent the clutch member 82 and clutch portion 83 from closing against the clutch plate 84 which is secured through rivet 85 and clutch plate support 86 to the second shaft 16. In the second condition, the fluid pressure drops and the spring 87 forces the clutch member 82 and clutch portion 83 against clutch plate 84, and the second shaft 16 is thereby prevented from rotation with respect to the fixed support.

Figure 7:
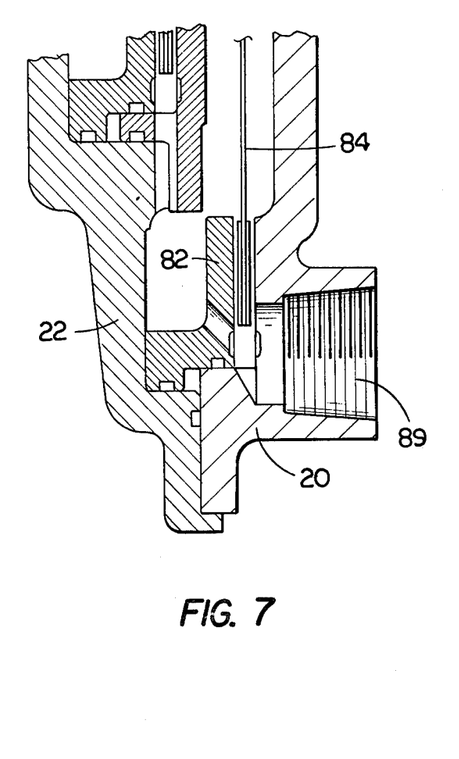
FIG. 7 is a partial, side cross-sectional view of the apparatus of FIG. 1, taken along the line 7—7 in FIG. 2 and looking in the direction of the arrows.

As is understood in the art, there is also provided a clutch lubrication port 88 (FIG. 6) which connects the fluid source with the chamber in which the clutch plates 75 and 84 are received. Similarly, a drain port 89 (FIG. 7) communicates with the clutch plate chamber to permit draining of fluid back to a reservoir.

The fan drive apparatus as shown in the first preferred embodiment in FIGS. 1-7 therefore provides three coupling speeds for the ring gear assembly 42 for a given speed of rotation of the planet gear carrier 23. The drive means operates to drive the planet gear carrier in rotation in a first direction 61 about the central axis 13 relative the fixed support. The first one-way clutch 14 is oriented to prevent rotation of the first sun gear 11 with respect to the first shaft 15 in the first direction, but does permit the sun gear 11 to rotate in the second direction, opposite the first direction, relative the shaft 15. Conversely, the second one-way clutch 55 is oriented to permit rotation of the ring gear assembly 42, and more specifically the housing member 44, in the first direction relative the second shaft 16, but prevents the ring gear assembly from rotating in the second direction relative the shaft 16.

In the low speed condition, the clutch mechanisms 62 and 63 permit the shafts 15 and 16 to rotate freely with respect to the fixed support. In the low speed mode, the one-way clutch 55, in combination with the connection of the ring gear assembly with the second shaft 16 through the planet gears 38, operates to cause the ring gear assembly and planet gear carrier to rotate in unison about the central axis. The reason for this may be understood as follows. If the ring gear assembly were to move slower than the planet gear carrier, then the planet gear 38 would be rotated in the second direction, which would in turn cause the sun gear 12 and second shaft 16 to rotate in the first direction faster than the ring gear assembly. The relative rotation, under this circumstance, between the ring gear assembly and the shaft 16 would be with the ring gear assembly rotating in the second direction with respect to the shaft 16. However, the one-way clutch 55 prevents such relative rotation between these two components, and the ring gear assembly therefore cannot rotate slower than the planet gear carrier. Although the ring gear assembly could rotate faster than the planet gear carrier, the fact that the clutch mechanisms 62 and 63 are not engaged means that there is no driving force to cause this result. Therefore, regardless of the speed of rotation for the ring gear assembly when the two clutch mechanisms are released, the ring gear assembly will slow down until it is rotating at the same rate as the planet gear carrier.

In the medium speed condition, the clutch mechanism 62 is engaged to stop the first shaft 15 from rotating relative the fixed support. At the same time, the second clutch mechanism 63 remains in the disengaged position and the shaft 16 is free to rotate relative the fixed support. Since the first one-way clutch 14 prevents the sun gear 11 from rotating in the first direction relative the shaft 15, the sun gear 11 will also be stopped from rotating with respect to the fixed support. The planet gear 37 will be rotated in the first direction causing the ring gear assembly to rotate in the first direction faster than the planet gear carrier.

To look at it differently, the ring gear assembly cannot move slower than the described rate since to do so would apply a force tending to rotate the planet gear 37 in the second direction, which in turn would urge the sun gear to rotate in the first direction relative the shaft 15 but this is prevented by the one-way clutch 14. It will be noted that the rotation of the ring gear assembly at this speed will result in the second shaft 16 rotating in the second direction relative the ring gear assembly, or in other words will cause the ring gear assembly to rotate in the first direction relative the shaft 16 which is permitted by the one-way clutch 55.

In the high speed mode, the clutch mechanism 63 is also engaged to stop rotation of the shaft 16, and therefore the sun gear 12, relative the fixed support. It will be appreciated that in certain embodiments of the present invention, such as the one shown particularly in FIG. 1, it would not be necessary for the other clutch mechanism 62 to be engaged during the high speed mode of the apparatus. However, in other embodiments it would be necessary for both to be engaged at the same time. In any event, it is desirable that they both be engaged in the high speed mode to eliminate any need for coordination between the two during transitions from one condition to the other.

In the high speed mode, the planet gear 38 will rotate in the first direction and will correspondingly drive the ring gear assembly 43 in the first direction faster than in the medium speed mode. It will be noted that the ring gear assembly therefore rotates in the first direction relative the second shaft 16, which is permitted by the one-way clutch 55. Similarly, the rotation of the ring gear assembly will cause the sun gear 11 to rotate in the second direction relative the first shaft 15, which is permitted by the one-way clutch 14.

The preferred embodiment as shown in FIGS. 1-7 for a multi-speed fan drive apparatus is variable in several respects within the contemplation and scope of the present invention. The described embodiment is preferred in that it provides a relatively simple construction for providing the necessary components and interrelationships as well as the three separate rotation-limiting means as described. An example of a modification of the present design which is intended to be covered by the present invention is the use of dual planet gears as are known in the art and as are shown, for example, in FIG. 13 of U.S. Pat. No. 3,532,008, issued to Fanstone on Oct. 6, 1970. In such a combination, a pair of intermeshed planet gears are employed, with one of such gears being intermeshed with the ring gear and the other of such gears being intermeshed with the sun gear. Although such devices are more complicated in structure, there may be advantages to them in certain situations, such as the obtaining of speed ratios not readily obtainable with a single planet gear arrangement. It will be appreciated that the use of such dual planet gears reverses the relative rotation of the sun gear with respect to the ring gear in the various modes of the drive. Corresponding modifications with respect to the positioning and orientation of the over-running clutches, or other changes in the particular rotation-limiting means employed, would then have to be made as would be apparent to those skilled in the art. For the purposes herein, the term "planet gear" is intended to encompass both the single and dual planet gear arrangements, or other multiple combinations.

A second preferred embodiment of a multi-speed fan drive constructed in accordance with the present invention is shown particularly in FIGS. 8-10. The apparatus 90 includes a first sun gear 91 and a second sun gear 92 independently rotatable about a common axis. An over-running clutch 93 is received between and connects a first shaft 94 and the first sun gear 91. As will be further described, the housing member 95 of the fan mount assembly is rotatably mounted to the first shaft 94 with a needle bearing 96. The shaft 94 includes an annular flange 97 which cooperates with the flange portion 98 of the housing member 95 to retain thrust washers 99 and 100, and therefore the first sun gear 91 and over-running clutch 93, in position.

A second, hollow shaft 101 is received about the first shaft 94 and an over-running clutch 102 is interposed therebetween for purposes which will be detailed below. The second sun gear 92 is secured to the second shaft 101 by a spline or other suitable means. The second shaft 101 includes an inwardly-extending shoulder 103 which cooperates with the flange 97 and thrust washer 104 to retain the over-running clutch 102 in position. A seal 105 is provided between the concentric shafts and a seal 107 is received between the support member 106 and the second shaft 101. The second shaft 101 is rotatable within a support member 106 which is in turn connected to a fixed support. Bearings such as 108 are provided to facilitate relative rotation of the shafts and support member.

A pulley member 109 is mounted about the support member 106 rotatable about the central axis. Ball bearings 110 and 111 are received between the pulley member 109 and the second shaft, the inner races being retained against a shoulder 112 on the support member with a spacer 113 therebetween, and clamp 114 secured to the support member with bolts 115. A connecting member 116 is secured to the pulley member 109 with bolts 117, and also serves to hold the outer race of the ball bearing 111 adjacent a shoulder 118 of the pulley member. A seal 119 is also included between the pulley member 109 and the support member 106.

The connecting member 116 is also secured with bolts 120 to a planet gear carrier 121. The planet gear carrier supports a set of first planet gears 122 and a set of second planet gears 123. The first planet gears 122 are mounted upon needle bearings 124 and shafts 125, the shafts being secured to the planet gear carrier 121. The second planet gears 123 are similarly mounted about needle bearings 126 which are received upon shafts 127 secured to the planet gear carrier. The first planet gears 122 are intermeshed with the first sun gear 91, and the second planet gears 123 are intermeshed with the second sun gear 92. The planet gear carrier 121 is received about the second shaft 101 and a needle bearing 128 is interposed therebetween.

A fan support housing 129 is mounted to the planet gear carrier 121. The fan support housing includes housing members 95 and 130 secured together with bolt and nut combinations 131. Fan blades 132 are secured to the fan support housing such as by the bolts 131. Ball bearings 133 and 134 are received between the fan support housing and the planet gear carrier and are maintained in place by shoulders suitably positioned in the housing members 95 and 130 and in the planet gear carrier 121. A ring gear assembly 135 is mounted within the fan support housing and includes a ring gear intermeshed with each of the first and second planet gears. A seal 136 is also provided between the housing member 130 and the connecting member 116, which is in turn secured to the planet gear carrier.

Attached to the first shaft 94 by a spline or other suitable means is a hub 137. A clutch plate 138 is secured to the hub 137 with shafts 139. A friction material 140 is secured to both sides of the outer portion of the clutch plate which is received between clutch members 141 and 142. A clutch support member 143 is secured to the support member 105 and a seal 144 is provided therebetween. The clutch member 142 is provided with a seal 145 adjacent the clutch support member 143 and is slidable with respect to the clutch support member in the direction of the arrow 146. A spring 147 is positioned between the clutch support member 143 and the clutch member 142 and urges the clutch member in the direction of the arrow 146. A pressure feed 148 leads from an oil source under pressure and connects with the cavity 149 between the clutch members 141 and 142. A seal 150 is provided between the clutch members to prevent the oil from passing from the cavity 149 into the area of the clutch plate 138.

The operation of the first clutch mechanism 151 is therefore similar to that for clutch mechanisms in auto transmissions and as previously described. When oil is supplied to the cavity 149 under pressure, the force of the spring 147 is overcome and the clutch members are spaced apart from the clutch plate 138. In this mode, the clutch plate 138 is free to move with respect to the clutch members, and the shaft 94 is therefore free to rotate. If the pressure source is blocked by suitable control valve means, then the spring 147 operates to force the clutch member 142 toward the clutch member 141 and the clutch plate 138 is engaged therebetween and rotation of the shaft 94 is stopped. Similarly, a second clutch mechanism 152 is provided and includes a clutch plate 153 having friction material 154 thereon and being mounted with rivets 155 to a hub 156 connected with the second shaft by a spline or other suitable means.

In operation, the multi-speed fan drive apparatus of the present invention provides a direct coupling to drive the fan at separate, specific speeds. The second preferred embodiment of the fan drive apparatus as shown in FIGS. 8–10, for example, provides for three distinct speeds for the fan drive. In the preferred embodiment, the fan blades are attached directly to the ring gear 135 through the fan support housing 129. As a result, the fan blade will turn at the same rate as the ring gear 135. It will be appreciated, however, that the fan could be mounted separately from the ring gear, and that the driving connection between the two could be arranged to yield a fan rate higher or lower than that of the ring gear. Suitable drive means for the pulley member 109 are provided, such as a belt connection to the crankshaft of a vehicle engine or by other appropriate means.

At the slowest speed, the clutch mechanisms 151 and 152 are not engaged and the shafts 94 and 101 are therefore free to rotate relative the fixed support. However, the provision of the two over-running clutches operates to cause the shafts, sun gears, and planet gear carrier to rotate in unison, and therefore at the same rate as the ring gear 135. As will be further described below, the sun gears 91 and 92 being of different sizes, meaning for purposes herein that the gears have different numbers of teeth, causes the slowest speed to be effected. As will be shown below, the provision of the two, oppositely directed, over-running clutches in combination with the different sized sun gears will cause the system to lock up and have the ring gear rotate at the same speed as the planet gear carrier.

The multi-speed fan drive apparatus as shown in a preferred embodiment in FIGS. 8–10 has three separate speed conditions. At an intermediate speed, the clutch mechanism 151 is engaged by the reduction of pressure at the feed opening 148, thus permitting the spring 147 to operate to close the clutch members 141 and 142 together upon the clutch plate 138. This action causes the first shaft 94 to be prevented from rotating with respect to the fixed support. The over-running clutch 93 is oriented to prevent the first sun gear 91 from rotating with respect to the shaft 95 in the first direction 157.

The operation of the one-way clutch 93 may be understood by the following description. The planet gear carrier 121 is rotated in the first direction and in cooperation with the sun gear 91 causes the ring gear 135 to rotate in the same direction as the planet gear carrier and at a faster speed than the planet gear carrier. It will be appreciated that the ring gear 135 and particularly the fan support housing and fan blade, will provide a resistance in the second direction 158 against the revolving force applied by the planet gear carrier and the planet gears. This force will be applied in a direction urging the planet gears 122 to rotate in the second direction 158, and therefore urging the sun gear 91 to rotate in the first direction 157. The over-running clutch 93 is therefore oriented with respect to the first shaft 94 to prevent relative rotation of the sun gear 91 with respect to the first shaft 94 in the first direction. Since the sun gear is prevented from rotating in that direction, under the above description, the sun gear 91 remains stationary with respect to the shaft 94 and therefore the fixed support. Consequently, the planet gears 122 are rotated in the first direction 157 and therefore move the ring gear 135 in the first direction 157 faster than the planet gear carrier 121.

Since the sun gears 91 and 92 and the corresponding planet gears 122 and 123 have differing gear ratios, the sun gears cannot be simultaneously stopped with respect to the fixed support. Instead, one must be allowed to slip when the other is stopped. For the intermediate speed condition which has just been described, the ring gear 135 is driven by the sun gear 91. The rotation of the ring gear 135 is therefore slower than that which would occur if it were driven by the sun gear 92 being held in a stationary position with respect to the fixed support. As a result, the ring gear 135 rotating about and engaging the planet gears 123 causes them to revolve in the first direction 157 at a rate slower than the rotation at which the planet gears 123 would rotate if the sun gear 92 were stationary with respect to the fixed support. Therefore, the sun gear 92 is caused to rotate in the first direction 157, and the over-running clutch 102 is oriented to permit the shaft 101, upon which the sun gear 92 is mounted, to rotate with respect to the inner shaft 94 in the first direction.

The high speed mode for the multi-speed fan drive shown in particular in FIGS. 8-10 is accomplished by engaging the clutch mechanism 152 as well as the clutch mechanism 151. Under this condition, the sun gear 92 is held stationary with respect to the fixed support and in combination with the rotation of the planet gears 123 drives the ring gear 135 at a high speed, which is faster than the speed of rotation associated with the driving of the ring gear with the first sun gear 91. As a result, the planet gears 122 turn faster in the first direction 157 than they would if the sun gear 91 were stationary, and therefore cause the sun gear 91 to rotate in the second direction 158. By the orientation of the over-running clutch 93, the sun gear 91 is permitted to rotate in the second direction 158 with respect to the first shaft 94.

At the lowest speed for the ring gear 135, the clutch mechanisms 151 and 152 are not engaged, and the shafts 94 and 101 are therefore not held stationary with respect to the fixed support. However, the presence and positioning of the over-running clutches 93 and 102 cause the sun gears and planet gears to lock up, and therefore cause the ring gear 135 to rotate in the same direction and at the same speed as the planet gear carrier 121. This occurs because both of the sun gears 91 and 92 are received about the one-way clutches 93 and 102, which in turn are received upon the inner shaft 94. The over-running clutch 94 permits rotation of the sun gear 91 relative the shaft 94 only in the second direction 158, whereas the other over-running clutch 102 permits rotation of the sun gear 92 relative the shaft 94 only in the first direction 157. Consequently, the sun gears 91 and 92 cannot rotate relative the shaft 94 in the same direction and at different speeds, and the sun gears are therefore forced to lock up relative the shaft 94. This in turn requires that the respective planet gears lock up with the sun gears and that the shaft 94 rotate in the same direction and at the same speed as the planet gear carrier 121.

For example, the motion of the ring gear 135 is normally in the first direction 157, and the resistance to turning is applied in the second direction 158. This force urges the planet gears to rotate in the second direction 158, which in turn urges the sun gears to rotate in the first direction 157. The relative rotation of the sun gears, if they were free to rotate, would be in the same, first direction, but the sun gear 91 would rotate faster than the sun gear 92. As described, the over-running clutch 93 does not permit movement of the sun gear 91 in the first direction relative the shaft 94, and therefore, the rotation could only occur if the shaft 94 also rotated in the first direction relative the fixed support. The rotation of the shaft 94 in the first direction would be at the same rate as the sun gear 91 and therefore would be at a faster rate than the rotation of the sun gear 92. Since the shaft 91 would be moving faster than sun gear 92, the relative rotation of the sun gear 92 would be in the opposite or second direction 158 relative the shaft.

However, the over-running clutch 102 prevents rotation of the sun gear 92 relative the shaft 94 in the second direction, and therefore the described rotations of the sun gears in the same direction at different speeds cannot take place.

It will be appreciated that the sizing and arrangement of the respective sun gears and planet gears may be altered within the scope of the present invention. For example, as shown in the drawings, the planet gears 122 and 123 are mounted upon shafts 125 and 127, respectively, which are located at different radial distances from the central axis. Depending upon the desired sizing of the respective sun gears and planet gears, the planet gears 122 and 123 could be mounted on a common shaft extending therebetween as in the first embodiment. In this configuration, it would probably be most suitable to have the ring gear 135 have either a step configuration to provide a ring gear having different diameters to correspond with the differently positioned planet gears, or to have two separate ring gears (as in FIG. 1), each of which is mounted to a common support, such as the fan support housing. With variations of the aforementioned type, it may also be suitable to alter the location and relative positioning of the over-running clutches, or to provide other suitable means to limit rotation in the manner as described.

It is to be understood that the various components may be formed from standard materials. For example, the clutch mechanisms 151 and 152 may be similar to those used in standard automobile transmissions. The over-running clutches also are stock items and an example disclosure of such clutches is contained in the Tinholt, U.S. Pat. No. 4,046,239, issued on Sept. 6, 1977, the pertinent portions of which are hereby incorporated by reference.

Figure 11:
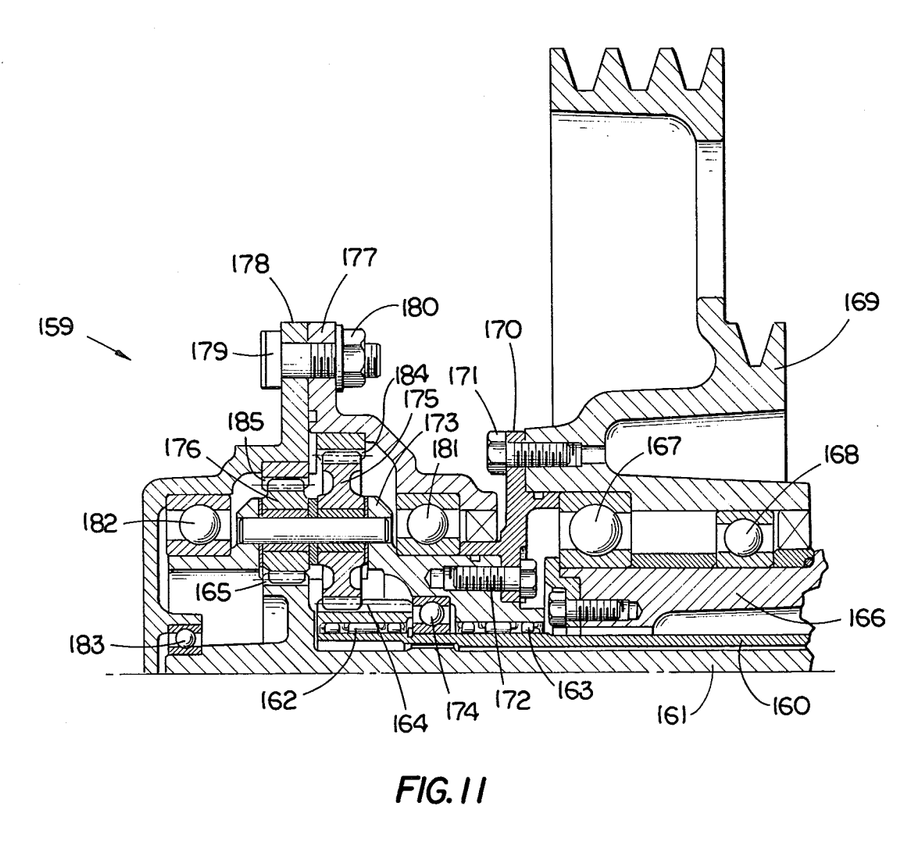
FIG. 11 is a partial, side cross-sectional view of the upper half of a third embodiment of a multi-speed fan drive apparatus according to the present invention.

Another example of a multi-speed drive apparatus is shown in FIG. 11. The apparatus 159 is shown only in partial cross section, but would typically include a pair of clutch mechanisms or other stock means attached to the shafts 160 and 161 in a fashion similar to that described with respect to the first two embodiments. The embodiment 159 is given by way of example to show a further alternate arrangement for the mounting of the rotation-limiting means, in particularly by use of a pair of one-way clutches 162 and 163 as will be detailed below.

Briefly described, the apparatus 159 includes a first sun gear 164 and a second sun gear 165. A first one-way clutch 162 is mounted between and connects the first sun gear 164 with the first shaft 160. The second sun gear 165 is connected with, or preferably integral with, the second shaft 161.

A support member 166 is connectable to a fixed support and carries a pair of ball bearings 167 and 168 upon which is received a pulley member 169. A connecting member 170 is secured with bolts 171 to the pulley member 169, and also is secured with bolts 172 to the planet gear carrier 173. A ball bearing 174 is mounted between the planet gear carrier 173 and the first shaft 160 to provide for relative rotation therebetween. The one-way clutch 163 is also mounted between and connects the planet gear carrier with the first shaft.

Similar to the prior embodiments, the planet gear carrier rotatably supports at least a first planet gear 175 intermeshed with the first sun gear 164, and at least a second planet gear 176 intermeshed with the second sun gear 165. A ring gear assembly including housing members 177 and 178 connected with bolts 179 and nuts 180 is rotatably mounted to the planet gear carrier by ball bearings 181 and 182, and to the second shaft 161 by ball bearing 183. Ring gears 184 and 185 are secured to the ring gear assembly and are positioned to intermesh with the planet gears 175 and 176, respectively.

As with the two prior embodiments, the embodiment of FIG. 11 provides three separate coupling speeds for the ring gear assembly with respect to the planet gear carrier. In the low speed mode, the shafts 160 and 161 are both permitted to rotate freely, and similar to the second described embodiment the combination of the two one-way clutches 162 and 163 will cause the gears to lock up and have the ring gear assembly rotate at the same speed as the planet gear carrier. Assuming the prior convention that the planet gear carrier rotates in a first direction, the one-way clutch 162 permits the sun gear 164 to rotate relative the first shaft in the second direction, but prevents such rotation in the first direction. Conversely, the one-way clutch 163 permits the planet gear carrier 173 to rotate in the first direction relative the first shaft 160, but prevents the opposite relative rotation. As a result, the ring gear carrier will travel at the same rate as the planet gear carrier in the low speed mode.

As a brief explanation of this, it will be understood that rotation of the ring gear assembly slower than the planet gear carrier would cause the sun gear 164 to rotate in the first direction relative the shaft 160, and since this is prevented by the one-way clutch 162 then the shaft 160 would have to rotate in the first direction at the same speed as the sun gear 164. However, the shaft 160 would then rotate in the first direction faster than the planet gear carrier 173, meaning that the planet gear carrier would rotate in a second direction relative the shaft 160 which is prevented by the one-way clutch 163. Consequently, the ring gear assembly could not move slower than the planet gear carrier 163, and would instead move at the same rate.

In the middle speed mode, the first shaft 160 is prevented from rotating relative the fixed support and the second shaft 161 is permitted to rotate freely. In this condition, the one-way clutch 162 engages and the planet gear carrier 173 rotates in the first direction relative the shaft 160, which is permitted by the one-way clutch 163. In the high speed mode, both of the shafts 160 and 161 are prevented from rotating relative the fixed support, and both the sun gear 164 and planet gear carrier 173 rotate in directions permitted by the one-way clutches 162 and 163, respectively.

Figure 12:
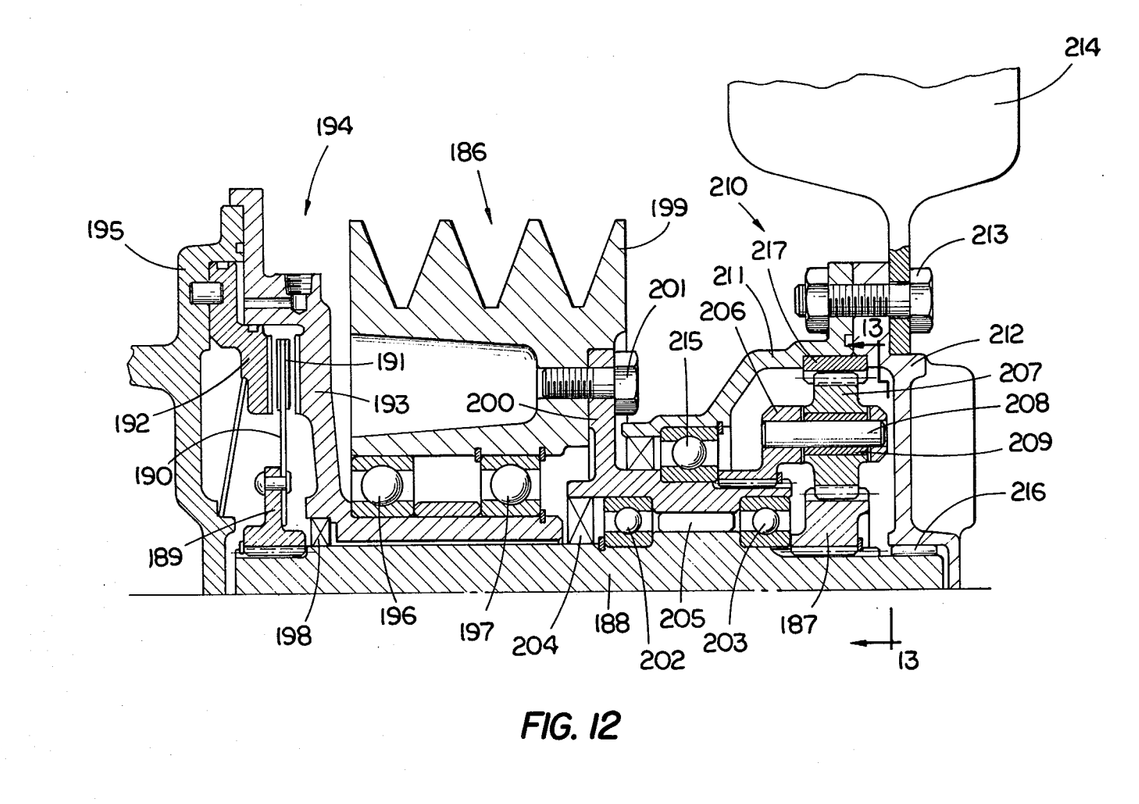
FIG. 12 is a partial, side cross-sectional view of the upper half of a fourth embodiment of a multi-speed fan drive apparatus constructed in accordance with the present invention.
Figure 13:
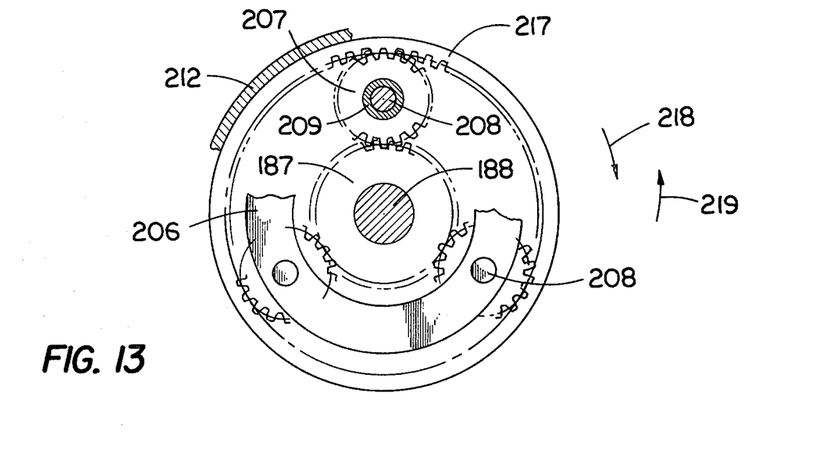
FIG. 13 is an end, somewhat schematic cross-sectional view of an apparatus as shown in FIG. 12, taken along line 13—13 and looking in the direction of the arrows.

Referring now in particular to FIGS. 12 and 13, there is shown an alternate embodiment of the multi-speed fan drive apparatus of the present invention. The apparatus 186 includes a sun gear 187 mounted to a shaft 188 by a spline or other suitable means, the shaft and sun gear being rotatable about a central axis. A hub 189 is also secured to the shaft 188 by a spline or other suitable means, and a clutch plate 190 is secured to the hub. The outer perimeter of the clutch plate 189 includes layers of friction material 191, and it is disposed between clutch members 192 and 193. These components form a clutch mechanism 194 which is substantially identical to those shown and described with respect to the earlier embodiments, and the further details of the clutch mechanism 87 will therefore not be provided herein.

Clutch member 193 is secured to a fixed support 195 and carries a pair of ball bearings 196 and 197 having a spacer therebetween. A seal 198 is disposed between the clutch member 193 and shaft 188. A pulley member 199 is received against the ball bearings 196 and 197 and a connecting member 200 is secured to the pulley member by bolts 201.

A pair of ball bearings 202 and 203 are mounted between the shaft 188 and the connecting member 200 to permit rotation of the connecting member with respect to the shaft and about the central axis. A seal 204 is also disposed between the connecting member 200 and shaft 188, and an over-running clutch 205 is similarly positioned between the ball bearings 202 and 203. A planet gear carrier 206 is secured to the connecting member 200 by a spline or other suitable connecting means. The planet gear carrier 206 includes planet gears 207 mounted upon shafts 208 received in apertures in the planet gear carrier, with needle bearings 209 disposed between the planet gears and the shafts. The planet gears 207 are preferably three or more in number and evenly spaced about the planet gear carrier. The planet gears are intermeshed with the sun gear 187.

A fan support housing 210 is mounted to the fan drive apparatus and particularly includes housing members 211 and 212 secured together with bolt and nut combinations 213, and having fan blades 214 similarly secured to the housing such as by bolts 213. The housing member 211 is bearingly mounted to the connecting member 200 with ball bearings 215, thereby permitting relative rotation of the fan support housing with respect to the planet gear carrier 206, about the central axis. A needle bearing 216 is received between the shaft 188 and housing member 212 to facilitate relative rotation of the fan support housing with respect to the center shaft. A ring gear 217 is mounted within the fan support housing 210 and is intermeshed with the planet gears 207.

By the described construction, a multi-speed fan drive apparatus is provided which has two speeds or modes of operation. The drive means is provided to drive the planet gear carrier 206 in a first direction 218 as shown in FIG. 13. In the low speed mode, the over-running clutch 205 operates to prevent relative rotation between the sun gear 187 and the planet gear carrier 206 by preventing the sun gear 187 from rotating in the first direction relative the planet gear carrier. More particularly, the ring gear 217 is driven in the first direction 218 by the planet gears carried on the planet gear carrier. The resistance to such movement is applied in the opposite direction 219 (FIG. 13), which in turn urges the planet gears 207 to rotate in the second direction 219. This in turn urges the sun gear to rotate in the first direction 218. Since the sun gear is prevented from such rotation relative the planet gear carrier, the sun gear and planet gear will rotate at the same rate. In this manner, the rotation of the planet gears with respect to the planet gear carrier is also stopped, and the ring gear is driven at the same rate of rotation as the planet gear carrier.

In the high speed mode of operation, the clutch mechanism 194 is engaged, thereby preventing the sun gear from rotating with respect to the fixed support. As the planet gear carrier rotates about the sun gear in the first direction, the planet gears are caused to also rotate in the first direction, thereby driving the ring gear in the first direction at a rate faster than the planet gear carrier. It will be noted also that the orientation of the one-way clutch 205 is such that this mode of operation is permitted. Since the sun gear is stationary with respect to the fixed support while the planet gear carrier moves in the first direction 218, the relative rotation of the sun gear with respect to the planet gear carrier is in the second direction 219. As previously indicated, the over-running clutch is oriented to permit the sun gear to rotate relative the planet gear carrier in the second direction 219, but to prevent the relative rotation in the first direction.

As previously stated with respect to the earlier embodiments, variations in the embodiment of FIGS. 12 and 13 will be apparent to those skilled in the art and are contemplated by and fall within the scope of the present invention. For example, variations such as those specifically described with respect to the earlier embodiments could be adapted for use in modifying the embodiment of FIGS. 12 and 13 without departing from the present invention.

The multi-speed fan drive apparatus of the present invention provides a fan drive having several distinct features and advantages. In contrast to the fluid shear drives, the present invention yields a direct drive at two or more speeds, with modulated variable speeds inbetween these points during the time of engaging or disengaging the clutch mechanisms. The speeds at the different levels are precisely controllable, depending upon the selected gearing for the sun gears and planet gears. The fan drive apparatus is also more flexible for use in different equipment and for different specifications due to this ability to select with precision the various speeds of operation.

It will also be appreciated that the present invention, such as shown in FIGS. 1–7 could be further modified to yield four or more speeds by including additional sun/planet gear arrangements in combination with an associated clutch mechanism and over-running clutch, or by the use of other means to limit the rotation of the added components in a particular direction. Generally, with each additional sun/planet gear arrangement an additional drive speed could be obtained.

Controls for the present fan drive apparatus are also easily employed since, for example, the only control input necessary is the control of oil pressure for the respective clutch mechanisms. It is desirable to control the mode of operation by reference to a selected, monitored temperature utilizing standard control devices. The temperature in the engine coolant, for example, could be directly monitored for controlling the fan speed, as well as other data such as the vehicle speed. The present mechanism has a wide range of uses as a fan drive apparatus, and is particularly well suited for heavy and large vehicles such as bulldozers, log skidders, loaders, scrapers, heavy-duty trucks, and other earth-moving and handling equipment.

The present apparatus also provides other advantages over the prior art devices. For example, the problems of fluid variations, fluid evacuation problems, and input speed limitations associated with fluid shear drives are avoided. The apparatus also avoids fan matching or compromising associated with prior art devices. There is a wide variety of input speeds which are operable for the present device, and low input speeds in particular do not present a problem as with other devices in the art. The described constructions yield structures rigidly supported against thrust and radial loads, and have a maximum capacity with a minimum size. The design is relatively simple in configuration and utilizes stock, predictable type hardware.

As indicated in the prior art discussion, a particular advantage of the present invention is the absence of significant inefficiencies or losses which occur with the fluid shear drives. In particular, the fluid shear drives have a maximum inefficiency or loss, typically over 20% of the maximum fan power required, at low fan speeds. This is a particularly serious factor since the mode of operation for such fan drives is typically at the low speed mode for the majority of the time, perhaps as much as 90% of the time. Another advantage of the present invention is the fact that the various clutching mechanisms and over-running clutches do not take the full or maximum fan torque, and typically the most loaded clutch does not take more than 50% of the maximum fan torque. This factor contributes signficantly to the long life and reliability of the multi-speed fan drive apparatus of the present invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A multi-speed fan drive apparatus which comprises:
   first and second sun gears, said second sun gear having more gear teeth than said first sun gear;
   first mounting means for mounting said first and second sun gears to a fixed support and independently rotatable about a common central axis;
   a planet gear carrier including at least a first rotatable planet gear intermeshed with said first sun gear and at least a second rotatable planet gear intermeshed with said second sun gear;
   second mounting means for mounting said planet gear carrier rotatable about the central axis;
   drive means for rotating said planet gear carrier;
   a ring gear assembly including a ring gear intermeshed with each of the first and second planet gears;
   third mounting means for mounting said ring gear assembly with the ring gear rotatable about the central axis;
   a plurality of fan blades;
   fourth mounting means for mounting said fan blades in driving connection with said ring gear assembly;
   first rotation-limiting means for preventing said first sun gear from rotating about the central axis in a first direction relative the fixed support;
   second rotation-limiting means for preventing said second sun gear from rotating about the central axis in a second direction, opposite the first direction, relative the fixed support; and
   third rotation-limiting means for causing said planet gear carrier and said ring gear assembly to rotate about the central axis in unison.

2. The apparatus of claim 1 in which said drive means is for rotating said planet gear carrier in the first direction.

3. The apparatus or claim 2 in which said fourth mounting means is for mounting said fan blades to said ring gear assembly and rotatable about the central axis.

4. The apparatus of claim 2 in which said rotation-limiting means include first and second members rotatable about the central axis relative the fixed support, first and second stop means for stopping rotation of the first and second members, respectively, relative the fixed support, said second sun gear being secured to the second member to prevent relative rotation therebetween, a first one-way brake connecting said first sun gear and the first member to prevent rotation of said first sun gear about the central axis in the first direction relative the first member, and a second one-way brake connecting said ring gear assembly and the second member to prevent rotation of said ring gear assembly about the central axis in a second direction relative the second member.

5. The apparatus of claim 2 in which said first mounting means includes a first shaft mounted to the fixed support rotatable about the central axis, said first sun gear being received upon and rotatable about the first shaft, said first mounting means further including a second shaft mounted to the fixed support rotatable about the central axis, said second sun gear being secured to the second shaft to prevent relative rotation therebetween.

6. The apparatus of claim 5 in which the second shaft is concentric with and received within the first shaft.

7. The apparatus of claim 5 in which said rotation-limiting means include a first one-way brake connecting said first sun gear and the first shaft and preventing said first sun gear from rotating about the central axis in the first direction relative the first shaft but permitting said first sun gear to rotate about the central axis in a second direction relative the first shaft, said rotation-limiting means also including a second one-way brake connecting said ring gear assembly and the second shaft and preventing said ring gear assembly from rotating about the central axis in the second direction relative the second shaft but permitting said ring gear assembly to rotate about the central axis relative the second shaft in the first direction, said rotation-limiting means further including a first stop means for stopping rotation of the first shaft relative the fixed support and a second stop means for stopping rotation of the second shaft relative the fixed support, the apparatus having three conditions of operation comprising a low speed for the ring gear assembly in which the first and second shafts are permitted to rotate by the first and second stop means, the second one-way brake prevents rotation of said ring gear assembly in the second direction relative the second shaft, and said ring gear assembly, said planet gear carrier, said sun gears and the first and second shafts rotate in unison; a medium speed in which the first stop means and first one-way brake prevent rotation of the first shaft relative the fixed support and of said first sun gear in the first direction relative the fixed support, said ring gear assembly rotates in the first direction faster than said planet gear carrier, and said ring gear assembly rotates in the first direction relative the second shaft; and high speed in which the second stop means prevents rotation of the second shaft and said second sun gear relative the fixed support, said ring gear assembly rotates in the first direction faster than in the medium speed condition, and said first sun gear rotates in the second direction relative the first shaft.

8. The apparatus of claim 7 in which in the high speed condition said first stop means prevents rotation of the first shaft relative the fixed support.

9. The apparatus of claim 7 in which the first stop means includes a first clutch mechanism connecting between the first shaft and the fixed support and operable to stop rotation of the first shaft relative the fixed support, and in which the second stop means includes a second clutch mechanism connecting between the second shaft and the fixed support and operable to stop rotation of the second shaft relative the fixed support.

10. The apparatus of claim 9 in which the second shaft is concentric with and received within the first shaft.

11. The apparatus of claim 10 in which said fourth mounting means is for mounting said fan blades to said ring gear assembly and rotatable about the central axis.

12. The apparatus of claim 7 in which said ring gear assembly includes a first ring gear intermeshed with the first planet gear and a second ring gear intermeshed with the second planet gear.

13. The apparatus of claim 2 in which said rotation-limiting means include first and second members rotatable about the central axis relative the fixed support, first and second stop means for stopping rotation of the first and second members, respectively, relative the fixed support, said second sun gear being secured to the second member to prevent relative rotation therebetween, a first one-way brake connecting said first sun gear and the first member to prevent rotation of said first sun gear about the central axis in the first direction relative the first member, and a second one-way brake connecting said planet gear carrier and the first member to prevent rotation of said planet gear carrier about the central axis in a second direction relative the first member.

14. The apparatus of claim 2 in which said first mounting means includes a first shaft mounted to the fixed support rotatable about the central axis, said first sun gear being received upon and rotatable about the first shaft, said first mounting means further including a second shaft mounted to the fixed support rotatable about the central axis, said second sun gear being secured to the second shaft to prevent relative rotation therebetween, said rotation-limiting means including a first one-way brake connecting said first sun gear and the first shaft and preventing said first sun gear from rotating about the central axis in the first direction relative the first shaft but permitting said first sun gear to rotate about the central axis in a second direction relative the first shaft, said rotation-limiting means also including a second one-way brake connecting said planet gear carrier and the first shaft and preventing said planet gear carrier from rotating about the central axis in the second direction relative the first shaft but permitting said planet gear carrier to rotate about the central axis relative the first shaft in the first direction, said rotation-limiting means further including a first stop means for stopping rotation of the first shaft relative the fixed support and a second stop means for stopping rotation of the second shaft relative the fixed support, the apparatus having three conditions of operation comprising a low speed for the ring gear assembly in which the first and second shafts are permitted to rotate by the first and second stop means, the two one-way brakes prevent rotation of said planet gear carrier relative the first shaft, and said ring gear assembly, said planet gear carrier, said sun gears and the first and second shafts rotate in unison; a medium speed in which the first stop means and first one-way brake prevent rotation of the first shaft relative the fixed support and of said first sun gear in the first direction relative the fixed support, said ring gear assembly rotates in the first direction faster than said planet gear carrier, and said second sun gear rotates freely; and a high speed in which the second stop means prevents rotation of the second shaft and said second sun gear relative the fixed support, said ring gear assembly rotates in the first direction faster than in the medium speed condition, and said first sun gear rotates in the second direction relative the first shaft.

15. The apparatus of claim 14 in which the first stop means includes a first brake mechanism connecting between the first shaft and the fixed support and operable to stop rotation of the first shaft relative the fixed support, and in which the second stop means includes a second brake mechanism connecting between the second shaft and the fixed support and operable to stop rotation of the second shaft relative the fixed support.

16. The apparatus of claim 15 in which the second shaft is concentric with and received within the first shaft.

17. The apparatus of claim 16 in which said ring gear assembly includes a first ring gear intermeshed with the first planet gear and a second ring gear intermeshed with the second planet gear.

18. The apparatus of claim 2 in which said rotation-limiting means include first and second members rotatable about the central axis relative the fixed support, first and second stop means for stopping rotation of the first and second members, respectively, relative the fixed support, said second sun gear being secured to the second member to prevent relative rotation therebetween, a first one-way brake connecting said first sun gear and the first member to prevent rotation of said first sun gear about the central axis in the first direction relative the first member, and a second one-way brake connecting said second sun gear and the first member to prevent rotation of said second sun gear about the central axis in a second direction relative the first member, the first and second one-way brake cooperating to provide rotation of said planet gear carrier and said ring gear assembly in unison about the central axis when both of the first and second members are permitted to rotate relative the fixed support.

19. The apparatus of claim 2 in which said first mounting means includes a first shaft mounted to the fixed support rotatable about the central axis, said first sun gear being received upon and rotatable about the first shaft, said first mounting means further including a second shaft mounted to the fixed support rotatable about the central axis, said second sun gear being secured to the second shaft to prevent relative rotation therebetween, said rotation-limiting means including a first one-way brake connecting said first sun gear and the first shaft and preventing said first sun gear from rotating about the central axis in the first direction relative the first shaft but permitting said first sun gear to rotate about the central axis in a second direction relative the first shaft, said rotation-limiting means also including a second one-way brake connecting said ring gear assembly and the second shaft and preventing said ring gear assembly from rotating about the central axis in the second direction relative the second shaft but permitting said ring gear assembly to rotate about the central axis in the first direction relative the second shaft, said rotation-limiting means further including a first stop means for stopping rotation of the first shaft relative the fixed support and a second stop means for stopping rotation of the second shaft relative the fixed support, the apparatus having three conditions of operation comprising a low speed for the ring gear assembly in which the first and second shafts are permitted to rotate by the first and second stop means the two one-way brakes prevent rotation of said sun gears relative the first shaft, and said ring gear assembly, said planet gear carrier, said sun gears and the first and second shafts rotate in unison; a medium speed in which the first stop means and first one-way brake prevent rotation of the first shaft relative the fixed support and of said first sun gear in the first direction relative the fixed support, said ring gear assembly rotates in the first direction faster than said planet gear carrier, and said second sun gear rotates in the first direction relative the first shaft; and a high speed in which the second stop means prevents rotation of the second shaft and said second sun gear relative the fixed support, said ring gear assembly rotates in the first direction faster than in the medium speed condition, and said first sun gear rotates in the second direction relative the first shaft.

20. The apparatus of claim 19 in which the first stop means includes a first brake mechanism connecting between the first shaft and the fixed support and operable to stop rotation of the first shaft relative the fixed support, and in which the second stop means includes a second brake mechanism connecting between the second shaft and the fixed support and operable to stop rotation of the second shaft relative the fixed support.

21. The apparatus of claim 20 in which the first shaft is concentric with and received within the second shaft.

22. The apparatus of claim 21 in which said fourth mounting means is for mounting said fan blades to said ring gear assembly and rotatable about the central axis.

23. The apparatus of claim 22 in which said ring gear assembly includes a first ring gear intermeshed with the first planet gear and a second ring gear intermeshed with the second planet gear.

24. A multi-speed drive apparatus which comprises:
first and second sun gears, said second sun gear having more gear teeth than said first sun gear;
first mounting means for mounting said first and second sun gears to a fixed support and independently rotatable about a common central axis;
a planet gear carrier including at least a first rotatable planet gear intermeshed with said first sun gear and at least a second rotatable planet gear intermeshed with said second sun gear;
second mounting means for mounting said planet gear carrier rotatable about the central axis;
drive means for rotating said planet gear carrier about the central axis;
a ring gear assembly including a ring gear intermeshed with each of the first and second planet gears;
third mounting means for mounting said ring gear assembly with the ring gear rotatable about the central axis;
first rotation-limiting means for preventing said first sun gear from rotating about the central axis in a first direction relative the fixed support;
second rotation-limiting means for preventing said second sun gear from rotating about the central axis in a second direction, opposite the first direction, relative the fixed support; and third rotation-limiting means for causing said planet gear carrier and said ring gear assembly to rotate about the central axis in unison, said rotation-limiting means including:

first and second members rotatable about the central axis relative the fixed support, first and second stop means for stopping rotation of the first and second members, respectively, relative the fixed support, said second sun gear being secured to the second member to prevent relative rotation therebetween.

first one-way brake means connecting said first sun gear and the first member and rotation of said first sun gear in the first direction relative the first member but permitting rotation of said first sun gear in a second direction relative the first member, and second one-way brake means, connecting two of said ring gear assembly, said planet gear carrier, said first sun gear, said second sun gear, the first member and the second member, for preventing relative rotation between the connected two and causing said planet gear carrier and said ring gear assembly to rotate in unison about the central axis, said apparatus having three conditions of operation comprising a low speed for the ring gear assembly in which the first and second members are permitted to rotate by the first and second stop means, the first and second one-way brake means prevent rotation of said ring gear assembly at a rate slower than that of said planet gear carrier, and said ring gear assembly, said planet gear carrier, said sun gears and the first and second members rotate in unison; a medium speed in which the first stop means and first one-way brake means prevent rotation of the first member relative the fixed support and of said first sun gear in the first direction relative the fixed support, and said ring gear assembly rotates in the first direction faster than said planet gear carrier; and a high speed in which the second stop means prevents rotation of the second member and said second sun gear relative the fixed support, and said ring gear assembly rotates in the first direction faster than in the medium speed condition.

25. The apparatus of claim 24 in which said drive means is for rotating said planet gear carrier in the first direction.

26. The apparatus of claim 25 in which the second one-way brake means connects said planet gear carrier and the first member and prevents rotation of said planet gear carrier in the second direction relative the first member but permits rotation of said planet gear carrier in the first direction relative the first member.

27. The apparatus of claim 25 in which the second one-way brake means connects said second sun gear and the first member and prevents rotation of said second sun gear in the second direction relative the first member but permits rotation of said second sun gear in the first direction relative the first member.

* * * * *

UNITED STATES PATENT AND TRADEMARK OFFICE
CERTIFICATE OF CORRECTION

PATENT NO. : 4,476,744

DATED : October 16, 1984

INVENTOR(S) : James W. Crooks

It is certified that error appears in the above-identified patent and that said Letters Patent is hereby corrected as shown below:

The title page should read: "Assignee: Household Manufacturing, Inc., Prospect Heights, Illinois"

In column 16, line 59, "or" should read "of"

In column 19, line 37, "brake" should read "brakes"

In column 20, line 4, "means" should read "means,"

In column 21, line 11, "therebetween." should read "therebetween,"

In column 21, line 13, "and rotation" should read "and preventing rotation"

Signed and Sealed this

Eighth Day of October 1985

[SEAL]

Attest:

Attesting Officer

DONALD J. QUIGG

Commissioner of Patents and Trademarks—Designate